(12) United States Patent
Phillip

(10) Patent No.: US 10,328,326 B2
(45) Date of Patent: *Jun. 25, 2019

(54) RATING SYSTEM FOR IDENTIFYING EXCITING SPORTING EVENTS AND NOTIFYING USERS

(71) Applicant: RUWT, LLC, Austin, TX (US)

(72) Inventor: Mark Phillip, Austin, TX (US)

(73) Assignee: RUWT, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/660,607

(22) Filed: Jul. 26, 2017

(65) Prior Publication Data

US 2017/0326430 A1   Nov. 16, 2017

Related U.S. Application Data

(63) Continuation of application No. 14/957,209, filed on Dec. 2, 2015, now Pat. No. 9,744,427, and a continuation of application No. 12/274,081, filed on Nov. 19, 2008, now Pat. No. 9,421,446.

(60) Provisional application No. 60/989,277, filed on Nov. 20, 2007.

(51) Int. Cl.
| | |
|---|---|
| A63F 9/24 | (2006.01) |
| A63B 71/06 | (2006.01) |
| G06Q 30/02 | (2012.01) |
| A63B 24/00 | (2006.01) |
| G08B 21/18 | (2006.01) |

(52) U.S. Cl.
CPC .............. *A63B 71/06* (2013.01); *A63B 24/00* (2013.01); *G06Q 30/02* (2013.01); *G08B 21/182* (2013.01)

(58) Field of Classification Search
USPC ............................................... 700/91; 463/42
See application file for complete search history.

(56) References Cited

U.S. PATENT DOCUMENTS

| | | | | |
|---|---|---|---|---|
| 7,218,839 B2 * | 5/2007 | Plourde, Jr. | ........ | H04N 5/44543 348/731 |
| 7,370,343 B1 * | 5/2008 | Ellis | .................... | H04N 5/44543 348/E5.105 |
| 2005/0138658 A1 * | 6/2005 | Bryan | .................... | H04H 60/27 725/46 |
| 2008/0064492 A1 * | 3/2008 | Oosthoek | ................ | G07F 17/32 463/26 |

* cited by examiner

*Primary Examiner* — Masud Ahmed
(74) *Attorney, Agent, or Firm* — Sprinkle IP Law Group

(57) ABSTRACT

Systems and methods for determining interest levels for sporting events and notifying users when the sporting events' interest levels reach threshold levels. One embodiment is a system that includes a processing engine that receives data associated with sporting events and, based on this data, determines interest levels associated with the sporting events. The system also includes a notification engine is coupled to the processing engine. When the processing engine determines that the interest level associated with a particular sporting event has reached a threshold, the notification engine provides notifications to users indicating that the threshold level has been reached.

20 Claims, 2 Drawing Sheets

RATING SYSTEM FOR IDENTIFYING EXCITING SPORTING EVENTS AND NOTIFYING USERS

CROSS-REFERENCE TO RELATED APPLICATIONS

This application is a continuation of U.S. patent application Ser. No. 14/957,209, by Mark Phillip, filed Dec. 2, 2015, which is a continuation of U.S. patent application Ser. No. 12/274,081, by Mark Phillip, filed Nov. 19, 2008, which claims the benefit of U.S. Provisional Patent Application 60/989,277, by Mark Phillip, filed Nov. 20, 2007, all of which are incorporated by reference as if set forth herein in their entirety.

BRIEF DESCRIPTION OF THE DRAWINGS

Other objects and advantages of the invention may become apparent upon reading the following detailed description and upon reference to the accompanying drawings.

Figure 1:
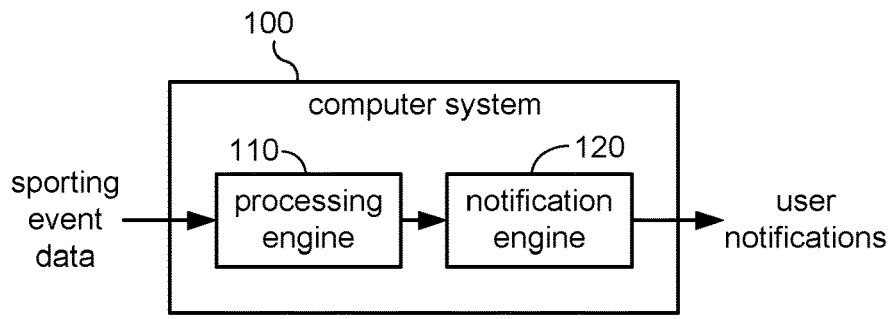
FIG. 1 is a functional block diagram illustrating the components of a system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

The invention relates generally to computer systems and more particularly to systems and methods for rating sporting events based, for example, on prior and current statistics and user input, and notifying users of games that would be appealing to them.

Embodiments of this invention create a rating system for sporting events that gauges how exciting a game is based on functions using prior and current game statistics as inputs as well as the opinion of fans. By matching various weighted scenarios, games can be compared and sorted based on how appealing they would be to the average person.

The large majority of sporting events that are deemed exciting can be identified by matching certain statistical criteria. A simple example is a Perfect Game in Baseball, one of the more rare and exciting occurrences in major sports. The box score for a developing Perfect Game has a team whose number of at-bats is equal to exactly 3 times the number of innings completed, and has none of their players reaching base.

A more involved example is a College Basketball game near the conclusion of overtime between two ranked teams, where the lower ranked team is winning by a narrow margin. Unlike the prior example that matched only one scenario, there are three scenarios in this example that can be identified by in-game statistics: a Close Finish, Overtime, and a possible Upset. Each of these fragments by themselves may not make for an extremely exciting game, but when all three are present it becomes a game most fans would find worthwhile.

Each scenario generates a different amount of excitement, generally proportional to its rarity. Various paradigms can be used to convey the appeal of games such as 1 to 5 star rating system, but at the core is a numerical value based on each scenario present. Scenarios such as a No-Hitter or Perfect Game are binary—either a game is a No-Hitter or it is not. Most others are variable—2 minutes left in a tie game and 2 seconds left in a tie game both qualify as close finishes, but the latter would be more exciting.

Creating specific functions for each scenario allows us to capture the varying weights for each, while incorporating its binary or variable behavior. Each function depends on different variables that can be found in the statistics for a current game, or the involved teams' histories, such as the sport played, the score, the team's ranking (if any), and the most used statistic: the amount of time left in the game.

In the end it is the combined weighted values of each of the scenarios found in a game's statistics that determines its appeal.

As described herein, various embodiments of the invention comprise systems and methods for determining interest levels for sporting events and notifying users when the sporting events' interest levels reach threshold levels.

One embodiment comprises a system that includes a processing engine and a notification engine. The processing engine receives data associated with sporting events and, based on this data, determines interest levels associated with the sporting events. The notification engine is coupled to the processing engine and, when the processing engine determines that the interest level associated with a particular sporting event has reached a threshold, the notification engine transmits notifications to users indicating that the threshold level has been reached.

The processing engine may be configured to receive the data associated with the sporting events from various sources, including static and live sources, local and remote sources, etc. This data may be plugged into one or more mathematical expressions that are evaluated by the processing engine. The evaluation of the expressions results in an interest level value that is associated with the sporting event. This interest level value may then be compared with one or more threshold values (e.g., to determine whether the interest level is low, medium or high).

The notification engine may be configured to transmit notifications to users when one or all of the threshold levels of interest are reached. When one of these threshold levels is reached, the notification engine may notify the users through various means and may be provided to users collectively (e.g., via web site notifications) or individually (e.g., via e-mails or phone messages to specific individuals). In the case of individual notifications, the notification engine may filter a superset of users and send notifications only to a subset of the users. The notification engine may, for example, filter their users based on individual preferences of sports, teams, colleges, etc., or it may send notifications only to users who can view the associated sporting event on their respective television distribution systems (e.g., broadcast stations for a particular area, or cable or satellite systems associated with the users) or through online streams (e.g., espn360).

Another embodiment is a method for determining interest levels associated with sporting events and notifying users when the interest levels reach threshold values. The method includes receiving data associated with a sporting event, determining an interest level for the sporting event based on the received data, and notifying users when the interest level meets a threshold level.

Numerous other embodiments are also possible.

Referring to FIG. 1, a functional block diagram illustrating the components of one embodiment of the invention is shown. In this embodiment, a computer system 100 includes a processing engine 110 and a notification engine 120. Processing engine 110 and notification engine 120 may consist of separate hardware components, or they may be software (or firmware) modules that are executed by a single piece of hardware. Processing engine 110 includes one or more data interfaces that allow it to receive information relating to various sporting events. An interconnect or internal interface is provided between processing engine 110 and notification engine 120 so that the two can communicate with each other. Notification engine 120 has one or more outgoing data interfaces to enable it to provide notifications to users when appropriate.

Figure 2:
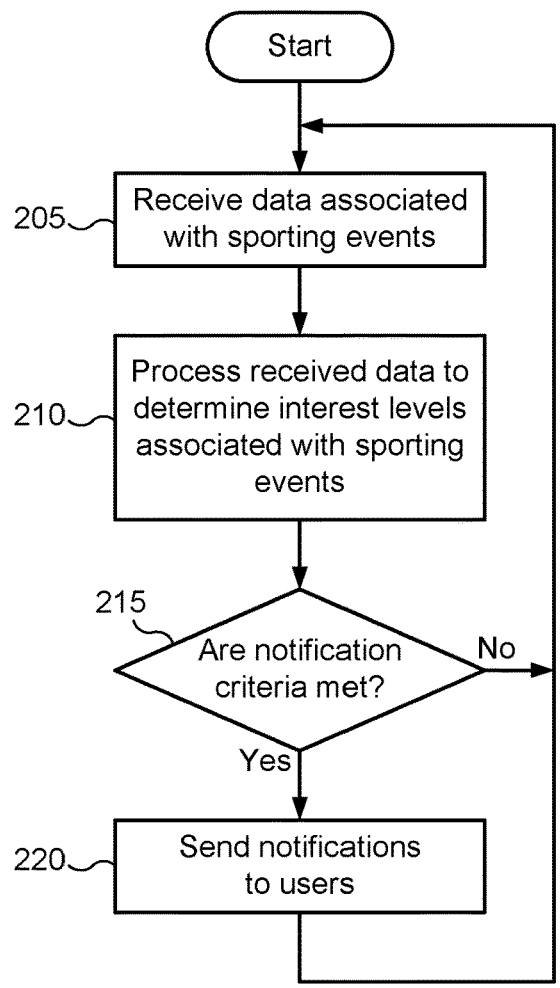
FIG. 2 is a diagram illustrating the operation of a system such as the one shown in FIG. 1.

Referring to FIG. 2, a flow diagram illustrating the operation of a system such as the one shown in FIG. 1 is shown. As shown in this figure, the process begins with the system receiving information associated with one or more sporting events or other contests (205). The received information is then processed to determine whether particular criteria associated with users' interest in the contests have been met (210). If the criteria have not been met (215), the process returns to step 205, where additional information is received and it is determined based upon the new information whether or not the criteria have been met. It should be noted that the stream of incoming information typically is not constant, and the system may be configured to sleep until new information is received, at which time the new information will be processed. If at step 215 one or more of these criteria have been met, the process proceeds to step 220, at which notifications are sent to users to make them aware that the criteria have been met (i.e., that the contest has become interesting.)

Referring again to FIG. 1, processing engine 110 receives information relating to one or more sporting events via the incoming data interfaces. The information can be associated with many different types of sporting events. These may be athletic contests, such as football games, basketball games, baseball games, golf tournaments, tennis tournaments, or any other type of athletic event, as well as non-athletic contests, such as outer tournaments, billiards tournaments, and the like. Alternative embodiments could even be designed to handle non-sporting events, such as game shows (for example, the interest level in a quiz show could be determined based upon the amount of money that is at stake for a contestant.) It should be noted that references herein to games, sporting events, contests, and the like should be construed generally to include any of these types of contests.

Many different types of information and be obtained for the various contests. This information may include, for example, scores, time remaining in the contest, whether the contest is in an overtime period, whether the contestants are highly regarded (e.g., whether a college team is nationally ranked), whether one contestant is positioned to upset the other, and so on. The information that is relevant to each contest may vary, depending upon the type of contest. For instance, the number of timeouts remaining may be relevant to a football game, while the number of innings remaining may be relevant to a baseball game. Whatever information is relevant to a particular type of sporting event, that information is evaluated using some a mathematical, logical or similar function to determine whether the sporting event is "interesting" or "exciting".

Of course, the question of whether or not a particular sporting event is interesting is a subjective one, so the functions that are used to evaluate the sporting events should ideally be selected based on factors that are generally accepted to indicate that the event is interesting. For instance, it is generally accepted that a game is more interesting if the "underdog" (the team or contestant that is not expected to win) is winning near the end of the game. Similarly, it is generally accepted that a game in which the scores of the respective contestants are very close near the end of the game is more interesting than one in which the scores are very disparate. While the functions should follow such generally accepted rules, it is clear that they may vary widely from one implementation of the system to another.

In one embodiment, the system uses mathematical expressions that are functions of the received information to determine the interest levels associated with particular sporting events. Data for a sporting event is inserted in the mathematical expressions, and the expressions are evaluated to produce an interest level value which is associated with that sporting event. Exemplary functions will be described in more detail below. Whenever new information is received for the sporting event, the functions are reevaluated and the interest level value is updated. Each time the interest level value for the sporting event is updated, this value is compared to several threshold values. These threshold values represent interest levels that may be considered to represent contests that are moderately interesting, very interesting, and extremely interesting. When the interest level value reaches one of these threshold values, the sporting event is considered to have escalated to the corresponding interest level, so users should be notified of this escalation. In one embodiment, users are notified only the first time a threshold is reached, in order to prevent inundating users with notifications if the interest level for a particular event fluctuates between values that are just above and just below a threshold level.

Users can be notified that a particular sporting event has reached one of the threshold interest levels in a variety of ways. The notifications can be general, such as updating an indication of the interest level for the sporting event on a web site that is accessible by multiple users. Alternatively, the notifications can be individual, such as e-mails or phone messages that are transmitted only to specific individuals. In one embodiment, individual notifications are not sent to every user that has access to the system, but are instead transmitted to specific individuals. These individuals may include only those users who have indicated an interest in the sporting events for which the notifications are sent, or those users who have television access to the sporting events. For example, if a user has indicated that he is a fan of the Dallas Cowboys, a notification may be sent to this user when a game involving the Dallas Cowboys becomes interesting. Alternatively, if a user indicates that he is a football fan and has broadcast television service in a particular area, a notification may be sent to this user when an interesting football game is broadcast in his viewing area.

Figure 3:
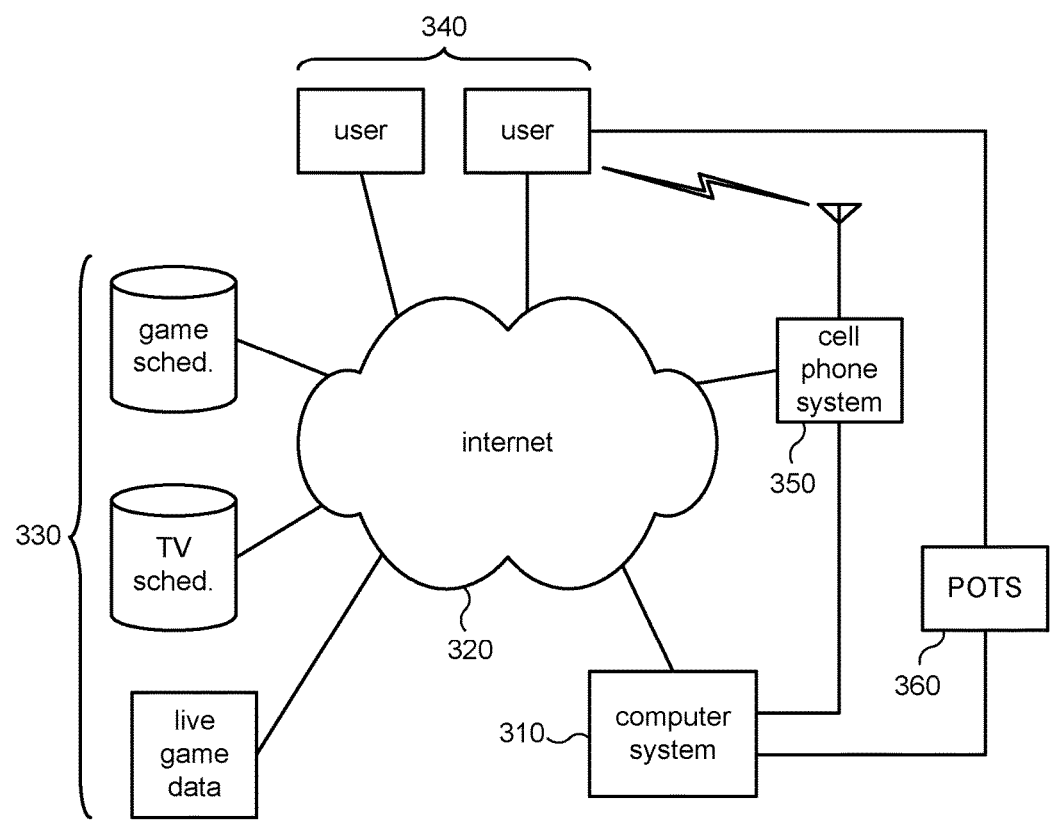
FIG. 3 is a flow diagram illustrating a system implemented in a computer system that is coupled to the Internet in accordance with one embodiment.

Referring to FIG. 3, a system in accordance with one embodiment is implemented in a computer system that is coupled to the Internet. In this embodiment, computer system 310 is connected to the Internet 320, which allows the computer system to communicate with various data sources 330 and users 340. In this embodiment, data sources 330 may include a variety of different types of information from various sources. For example, game schedules may be available on a web site for a particular sports team or league. Television schedules for these games may be available from databases maintained by television broadcast networks or cable or satellite television providers. When the games begin, live information such as scores may be obtained from broadcast networks or other sources. Computer system 310 may also obtain information from users 340. In one embodiment, users can cheer or "root" for particular sporting events to express their interest in these events. These "roots" can be added to, or can otherwise factor into the interest level for that particular sporting event. In this manner, a particular sporting event can reach a threshold interest level based in part upon the number of users who expressly indicate an interest in the event.

In addition to providing information that affects the interest level of a particular sporting event, users can provide other information that is used to determine which of the users are notified when the interest level for a particular sporting event reaches a threshold. For instance, each user may provide information regarding his or her favorite sports, favorite teams or specific sporting events in which they are interested. When the interest level associated with a particular sporting event reaches a threshold, the notification engine of the computer system may use this information to filter the recipients of the notifications, so that a particular user is only notified if he or she has expressed an interest in the sport or team involved in that sporting event, or in that particular sporting event itself. Users may also indicate the television distribution systems that are available to them. This information can be used to filter the notifications, so that a particular user is only notified if that user has access to a television broadcast of the event (whether by network broadcast, cable or satellite) or to online streams of the event (e.g., espn360).

Referring again to FIG. 3, when it is determined that users 340 should be notified of a change in the interest level of a particular sporting event, this can be accomplished in a number of ways. For example, computer system 310 can maintain a web site (see, e.g., AreYouWatchingThis.com) to show the current interest level of the sporting event. Typically, a number of different sporting events that are scheduled or in progress will have their respective interest levels displayed on the web site. Users can then access the web site to determine the interest levels of the different sporting events. Notifications can also be communicated to users via Internet 320 through e-mails to individual users 340. Alternatively, computer system 310 may be configured to send notifications via cell phone system 350 to individual users' cell phones. These cell phone notifications may include automated voice messages or text messages. Computer system 310 may also send e-mails to addresses associated with users' cell phones. These e-mails are converted by cell phone system 350 into text messages which are then transmitted to the users' cell phones.

The notifications provided by computer system 310 to users 340 make the users aware of interesting games so that they can, for example, watch these games on television. Often, the users have recording devices, such as VCRs (videocassette recorders) or DVRs (digital video recorders) on which they can record games for later viewing. In one embodiment, the system provides notifications in the form of programming instructions for these devices. These programming instructions can be communicated via Internet 320 if the devices are Internet-enabled, or they can be communicated via a standard telephone system 360 ("POTS" or Plain Old Telephone System). The programming instructions will cause the recording devices to record the games on the appropriate channels, as indicated by the respective television distribution systems that have previously been associated with the users.

As noted above, the interest level for a particular sporting event can be determined in many different ways, and the "best" way of doing so is a subjective matter. It may therefore be helpful to provide the following examples in which the interest level is determined or evaluated.

Evaluation of Interest Level

Game Progress

Sports divide time in their games in various ways, whether it's in halves, quarters, or untimed innings. For example, the halfway point of a baseball game is after the top of the 5th inning, while the halfway point of a U.S. Hockey game is 10 minutes left in the 2nd period.

A critical step in creating rules to rate games in a diverse set of sports, is converting the amount of time left in a match into a common metric. One strategy would be to change the time left in each game into a number from 100 to 0 with 100 being the start of the game, 50 being the halfway point, and 0 being the end of regulation. A scale of 100 is numerically problematic however, as sports like hockey that use 3 periods, would represent the end of the 1st Period by 33.3333. Working on a scale of 72, the lowest common denominator of 2 halves in Soccer, 3 periods in Hockey, 4 periods in Basketball, and 18 half innings in baseball, helps avoid fractional numbers at major milestones in a game.

Overtime is represented by negative progress numbers whose magnitude is equal to the amount of time in regulation. 10 minutes left in a Hockey game has a progress of 12, while a Hockey game 10 minutes into overtime has a progress of −12.

| Progress | Sport | Time Left |
|---|---|---|
| 72 | All | Beginning of Game |
| 48 | Baseball | End of 3rd Inning |
| 48 | Hockey | End of 1st Period |
| 48 | Soccer | 22.5 minutes elapsed in 1st Half |
| 36 | Baseball | Middle of the 5th Inning |
| 36 | Basketball | Halftime |
| 36 | Football | Halftime |
| 36 | Hockey | 10 minutes left in 2nd Period |
| 0 | All | End of Regulation |
| −24 | Baseball | End of the 12th Inning |
| −24 | Basketball | End of 1st Overtime |
| −48 | Baseball | End of the 15th Inning |
| −48 | Basketball | End of 2nd Overtime |

Scenario Examples

Close Finish

As a game reaches its conclusion, the smaller the difference between the scores of the teams involved (or between the leading contestants in sports such as Auto Racing and Golf), the more likely it is to be perceived as exciting. A 2-point difference in score in a professional basketball game carries a drastically different weight than a 2-point difference in a soccer game, so closeness is defined as a percentage of the winning team's score.

POWER(18−MAX(progress,0),2)/18)*((MAX (score1,score2)/10−ABS(score1−score2))*6)/ (MAX(score1,score2)/10

This rule adds 0-108 points for a game where the scores of the two teams are close and the game is almost over. A "close" game is defined as one where the difference between the two scores is 10% or less of the winning team's score.

In sports such as American Football, there are extended periods of time during which only one team generally has the opportunity to score, so the definition of a Close Finish is different. In the case of football, it is important in assessing the closeness of the contest to consider added characteristics of the game such as who has the possession of the ball, how close the team with possession is to the end zone, and how many timeouts each team has.

For example, if Team A is beating Team B by five points with 60 seconds left in the game, the following are three scenarios listed in order of drastically increasing excitement.
a) Team A has the ball and Team B doesn't have any timeouts.
b) Team B has the ball with no timeouts on its own 20 yard line.
c) Team B has the ball with two timeouts on its opponent's 20 yard line.

Games with Two Ranked Teams

Many college sports rank the top teams involved, generally the top 25. These teams are expected to have greater talent and to perform at a higher quality level, so these games are expected to be better.

$$(POWER(MAX(0, 49-(ranking1+ranking2)),2)/(POWER(46, 2)/65))+10$$

This rule adds 10-65 points to the rating based on how high the teams are ranked. The better the rankings (and lower the number) the better the game is expected to be. This rule is only used when both teams are ranked.

Upsets of Ranked Teams

It is generally believed that when a ranked team beats a team with a better ranking (a lower number) that the game is inherently more exciting. The rarity (and therefore the excitement) grows exponentially based on the difference between the two rankings. The largest upset isn't the 25th team beating a 1st team however; it's an unranked team beating the 1st ranked team. To model that in this rule, unranked teams are given a "ranking" 40% worse than the worst ranked team. If there are 25 teams ranked, the calculation for upsets uses a ranking of 35 for unranked teams. If the two teams are closely ranked (roughly five spots is considered "close"), then a lower ranked team beating a higher ranked team carries little or no weight.

$$POWER(ABS(ranking1-ranking2),2)/(POWER(35-1,2)/125)$$

This rule adds 0-100 points based on the spread of rankings. This rule is only used when the better ranked team is losing, or the score is close enough that it is a possibility. A "close" game is defined as one where the difference between the two scores is 10% or less of the winning team's score.

Perfect Games & No-Hitters (Sport Specific)

Some rules are only valid for specific sports. Perfect Games and No-hitters happen infrequently in professional baseball, making them quite appealing to fans. Since every game starts off as a Perfect Game and a No-hitter, it is not until a game reaches its halfway point that this rule begins to add points.

$$MAX(36-progress,0)*8$$

This rule adds 0-288 points (more for a game in extra innings) for a no-hitter, with no points added until the game gets to the halfway point. Perfect games use the same formula with a 1.25 multiplier.

Formula Glossary
Functions
POWER(x,y)—x to the y power
ABS(x)—The absolute value of x
MAX(x,y)—Returns the large of these two numbers
Inputs
progress—The amount of time left in the game converted to a 0-72 scale
score1—Team 1's current score in the game
score2—Team 2's current score in the game
ranking1—Team 1's ranking (if not ranked, (NUMBER_OF_TEAMS_RANKED*1.4) is used)
ranking2—Team 2's ranking (if not ranked, (NUMBER_OF_TEAMS_RANKED*1.4) is used)
Process Description Most major sports sites that provide scores depend on a 3rd party to provide updates as games progress. A feed (sometimes called a wire) is monitored and as updates arrive at the site, the new information is stored in a database to be later provided to visitors of the site.

Embodiments of this invention are typically encapsulated in their own processes (henceforth referred to as a "rating engine") monitoring the incoming sports information alongside whatever process that updates the site's database.

Depending on the verboseness of the feed, the rating engine may not be able to search for all scenarios on a game. If the updated information for a game contains only the score and time left, or if the site depends on manual or crowd sourced updates, only scenarios such as Close Finish or Overtime can be properly searched for and matched due to the lack of information. All scenarios can be searched for and matched when updated information about a game includes detailed statistics, and information about the teams involved is known.

Whenever new data arrives, the engine parses the information and begins a rating calculation. The first steps require the engine to lookup and calculate the inputs for the various scenario functions. The score for each team is trivial, and the calculation of the numerical progress (time left) is straightforward once the game's sport is determined. To run the function for an Upset, the rankings (if any) for the teams involved need to be looked up, most likely from a table in the same database that holds the score information for the game.

To run a function for a No-Hitter, Perfect Game, or Individual Performance, the specific statistics for a game need to be analyzed. Typical in-game statistics would contain a detailed data fragment like the one below that breaks down the performance by team and by player.

```
<BATTING_STATS teamcode="NYYANKEES">
    <PLAYER name="J Damon" pos="dh" id="1846236"
        ab="5" r="1" h="3" rbi="1" bb="0" so="1" lob="1"
        avg="0.263"></PLAYER>
    <PLAYER name="D Jeter" pos="ss" id="1846404"
        ab="5" r="1" h="1" rbi="1" bb="0" so="2" lob="4"
        avg="0.313"></PLAYER>
    <PLAYER name="B Abreu" pos="rf" id="1847070"
        ab="4" r="1" h="1" rbi="2" bb="1" so="1" lob="0"
        avg="0.286"></PLAYER>
    <PLAYER name="A Rodriguez" pos="3b"
        id="1846813" ab="4" r="0" h="1" rbi="1" bb="0"
        so="2" lob="1" avg="0.316"></PLAYER>
    <PLAYER name="J Posada" pos="c" id="1846706"
        ab="4" r="2" h="2" rbi="0" bb="1" so="0" lob="1"
        avg="0.339"></PLAYER>
```

```
<PLAYER name="H Matsui" pos="lf" id="2120500"
    ab="4" r="0" h="1" rbi="1" bb="1" so="1" lob="5"
    avg="0.290"></PLAYER>
<PLAYER name="J Giambi" pos="1b" id="1846747"
    ab="3" r="1" h="1" rbi="1" bb="2" so="2" lob="3"
    avg="0.243"></PLAYER>
<PLAYER name="R Cano" pos="2b" id="2084670"
    ab="4" r="1" h="1" rbi="1" bb="0" so="2" lob="5"
    avg="0.299"></PLAYER>
<PLAYER name="M Cabrera" pos="cf"
    id="2178418" ab="2" r="1" h="0" rbi="0" bb="2"
    so="0" lob="3" avg="0.287"></PLAYER>
<TEAM ab="35" r="8" h="11" rbi="8" bb="7"
    so="11"
lob="23"></TEAM>
</BATTING_STATS>
```

By identifying that the number of at-bats for this team is more than 3 times the number of completed innings, and that as a team they had 11 hits, this team is not on the offensive end of a Perfect Game or No-Hitter. If the opposing team also fails this check, the scenario does not match this game. Whenever a game doesn't match a scenario, the associated function contributes nothing to the game's total rating.

Once all inputs are defined, and matching scenarios are found, the rating engine notes each matching scenario and calculates the value of each associated function. The sum of each of the functions equals the total rating for the game.

Once the rating for a game is calculated, it should be stored in a database or similar data storage device. To successfully compare the change of the rating as the game progresses however, it is suggested that along with the total rating, the difference between the previous rating and the current rating is captured as well. This information can be captured using a database table structure like the one below.

| Field | Type | Description |
| --- | --- | --- |
| RatingID | int(10) unsigned | A unique ID for this rating |
| GameID | int(10) unsigned | The game that this rating applies to |
| Points | smallint(6) | The change in rating after the most recent calculation |
| Total | int(11) | The total rating number for this game |
| Date | datetime | The date and time of the rating |
| Rationale | varchar(250) | The reason for the rating (i.e. Upset, Close Finish) |

Of note in this structure is that the Points column, which represents the change in rating after the most recent calculation is signed, allows both positive and negative values. In many cases a game may at one point match multiple scenarios, yet as it progresses not match any at all. For example, if a College Basketball game is tied at 65 with 5:00 left, and the Close Finish function was the only matching scenario, the rating engine would give the game 27 points.

$$POWER(18-MAX(9,0),2)/18)*((MAX(65, 65)/10-ABS(65-65))*6)/(MAX(65, 65)/10=27$$

If one team scores enough points to have the game no longer qualify as a Close Finish, the scenario would not match, and a new Rating record would be added to the database table with −27 points and a total rating of 0. To determine the number of points the engine should add (or subtract) in a rating record, the engine must first determine the rating of the game just prior to the current calculation and use the difference.

The scenarios that make up the rating engine successfully identify statistic-based scenarios that make games appealing, but it doesn't capture the intangible stories and plot lines that can make a game exciting to fans. Therefore it is important to give users the ability to add a limited amount of points to the total rating for a game. By marrying the objectiveness of the rating engine with the subjective opinions of users, a more effective total rating can be achieved.

Although the effect each user can have on the total rating of a game should be minimal, as the number of contributing users grows the ratio of the weight of the users' ratings to the weight of the rating engine's ratings increases as well. To compensate, the number of points given by the rating engine needs to be increased over time as the number of participating users increases. To allow games to be compared across increases of the rating engine's weight, rating thresholds should be defined. A sample set of thresholds could be 0-74, 75-149, 150-224, and 225 and above. If the threshold ranges are increased in proportion to the increase in users (and therefore the increase in points contributed by the rating engine), games can be fairly compared based on which ordinal threshold it reached.

Ratings for each game can be easily integrated into any site that provides scores, but it is important to alert users who aren't presently interacting with the service that a game has achieved a high rating. As there can be more than 400 games scheduled among major sport leagues in one day, users can be overloaded with information. The typical response upon learning of an exciting game is to attempt to watch the game, so alerts are filtered based on what is available to the user to watch on TV or online. Daily, a separate process is run that performs pattern matching on TV listings and online streams against the day's sporting events, determining exactly which games are available for each user to watch via the Internet or on TV, based on their location and cable or satellite provider.

Once a game reaches a new threshold, if it is determined that the game is available for the user to watch, alerts are sent via SMS, email, web browser, desktop application, online embeddable flash widget, television, cable/satellite box, digital video recorder or other requested medium. Users can choose specific thresholds, teams, and sports about which they'd like to be alerted, as well as the medium on which the alert is delivered.

Users with units capable of recording television or online streams, such as Home Theater PCs or Digital Video Recorders can install a remote application that will periodically communicate with the database containing the rating engine's calculations either directly, or through a web service or API. Users can choose specific thresholds, teams, and sports describing exactly which games they would like recorded and under what circumstances. Due to the matching process performed to associate games with airing in TV listings, the recording devices will not be forced to guess when a game will end, instead ending only when the game is complete even if the game enters into overtime or extra innings. This same logic can also be used to automatically change recording requests for non-sporting events that may be impacted by a sporting event running later than expected (e.g., a television program that is delayed as a result of the sporting event running late). Users can also retain the option of permission-based recording. If not comfortable with recording every game that matches their set criteria, alerts sent to the user can be actionable, allowing him or her to ignore the game, or request that their recording device capture it.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A sporting event rating and notification system comprising:
   a rating engine, wherein the rating engine monitors one or more feeds from one or more external data sources, wherein the feeds contain game statistics describing a sporting event, wherein the rating engine determines a rating associated with the sporting event based on the received game statistics; and
   a notification engine coupled to the rating engine, wherein in response to the rating engine determining that the rating associated with the sporting event has changed, the notification engine provides corresponding notifications to a first set of one or more users, wherein each of the notifications provides an audible or visible indication that the rating has changed.

2. The sporting event rating and notification system of claim 1, wherein the rating is dependent upon the game statistics and user roots, wherein the user roots comprise user input expressing interest of a second set of users in the sporting event, wherein the second set of users is different from the first set of users.

3. The sporting event rating and notification system of claim 1, wherein the rating engine is configured to determine the rating for the sporting event by evaluating a mathematical expression that is a function of the received game statistics, and wherein the mathematical expression includes an objective rating component computed based on statistics of the sporting event and a subjective user opinion component computed based on a number of users that express interest in a particular sporting event.

4. The sporting event rating and notification system of claim 1, wherein the rating engine determines a number of users who expressly indicate interest in the sporting event, and wherein the rating engine increases the rating in response to an increase in the number of users who expressly indicate interest in the sporting event.

5. The sporting event rating and notification system of claim 1, wherein the one or more threshold levels comprise a first threshold level and the notifications comprise a first set of notifications indicating the first threshold level, the rating engine further being configured to determine when the rating associated with the sporting event meets a second threshold level which is higher than the first threshold level, wherein the notification engine is configured to provide a second set of notifications indicating the second threshold level in response to determining that the rating associated with the sporting event meets the second threshold level.

6. The sporting event rating and notification system of claim 1, wherein the rating engine determines whether the rating meets one or more threshold levels, wherein in response to the rating engine determining that the rating associated with the sporting event meets one or more of the threshold levels the notification engine provides corresponding notifications to the first set of one or more users and thereby provides an audible or visible indication that the rating has met corresponding ones of the threshold levels.

7. The sporting event rating and notification system of claim 1, wherein the notification engine is configured to provide the notifications by presenting the notifications on a web site that is accessible by the first set of one or more users.

8. The sporting event rating and notification system of claim 7, wherein the notification engine is configured to provide the notifications by updating an indication of the rating associated with the sporting event that is displayed on the web site.

9. The sporting event rating and notification system of claim 1, wherein the notification engine is configured to provide the notifications through a web service.

10. The sporting event rating and notification system of claim 1, wherein the notification engine is configured to provide the notifications through an API.

11. A sporting event rating and notification system comprising:
    a rating engine and a notification engine;
    wherein the rating engine is configured to monitor one or more feeds from one or more external data sources, wherein the feeds contain game statistics describing a sporting event, determine a rating associated with the sporting event based on the received game statistics, and determine whether the rating meets one or more threshold levels;
    wherein the notification engine is coupled to the rating engine and configured to provide notifications to one or more users in response to the rating engine determining that the rating associated with the sporting event meets the one or more threshold levels, wherein each of the notifications provides an indication that the rating has met the one or more thresholds;
    wherein the game statistics associated with the sporting event are received by the rating engine prior to completion of the sporting event and the notifications are provided to the user devices of the one or more users prior to completion of the sporting event; and
    wherein the notification engine is configured to provide the notifications in the form of programming instructions that are provided to a recording device, wherein the programming instructions are configured to cause the recording device to record at least a portion of the sporting event.

12. A method implemented in a sporting event rating and notification system, the method comprising:
    the sporting event rating and notification system monitoring one or more feeds from one or more external data sources, wherein the feeds contain game statistics describing a sporting event;
    the sporting event rating and notification system determining a rating associated with the sporting event based on the received game statistics; and
    the sporting event rating and notification system providing notifications to a first set of one or more users when the rating associated with the sporting event changes, wherein each of the notifications provides an audible or visible indication that the rating has changed.

13. The method of claim 12, wherein determining the rating associated with the sporting event based on the received game statistics comprises the sporting event rating and notification system evaluating a mathematical expression that is a function of the received game statistics.

14. The method of claim 13, wherein the received game statistics includes a score associated with the sporting event, a time metric associated with the sporting event, and user roots which express interest of a second set of users in the particular sporting event, wherein the second set of users is different from the first set of users.

15. The method of claim 12, wherein notifying the one or more users comprises providing notifications in the form of programming instructions that are provided to a recording device, wherein the programming instructions are configured to cause the recording device to record at least a portion of the sporting event.

16. The method of claim 13, wherein the mathematical expression includes an objective rating component computed based on statistics of the sporting event and a subjective user opinion component computed based on a number of users that express interest in a particular sporting event.

17. The method of claim 12, wherein the rating engine determines a number of users who expressly indicate interest in the sporting event, and wherein the rating engine increases the rating in response to an increase in the number of users who expressly indicate interest in the sporting event.

18. The method of claim 12, wherein the rating engine determines whether the rating meets one or more threshold levels, and wherein in response to the rating engine determining that the rating associated with the sporting event meets the one or more threshold levels, the notification engine is configured to provide corresponding notifications to one or more users indicating that the rating has met the one or more thresholds.

19. The method of claim 12, wherein the notifications are provided through a web service.

20. The method of claim 12, wherein the notifications are provided through an API.

* * * * *